UNITED STATES PATENT OFFICE.

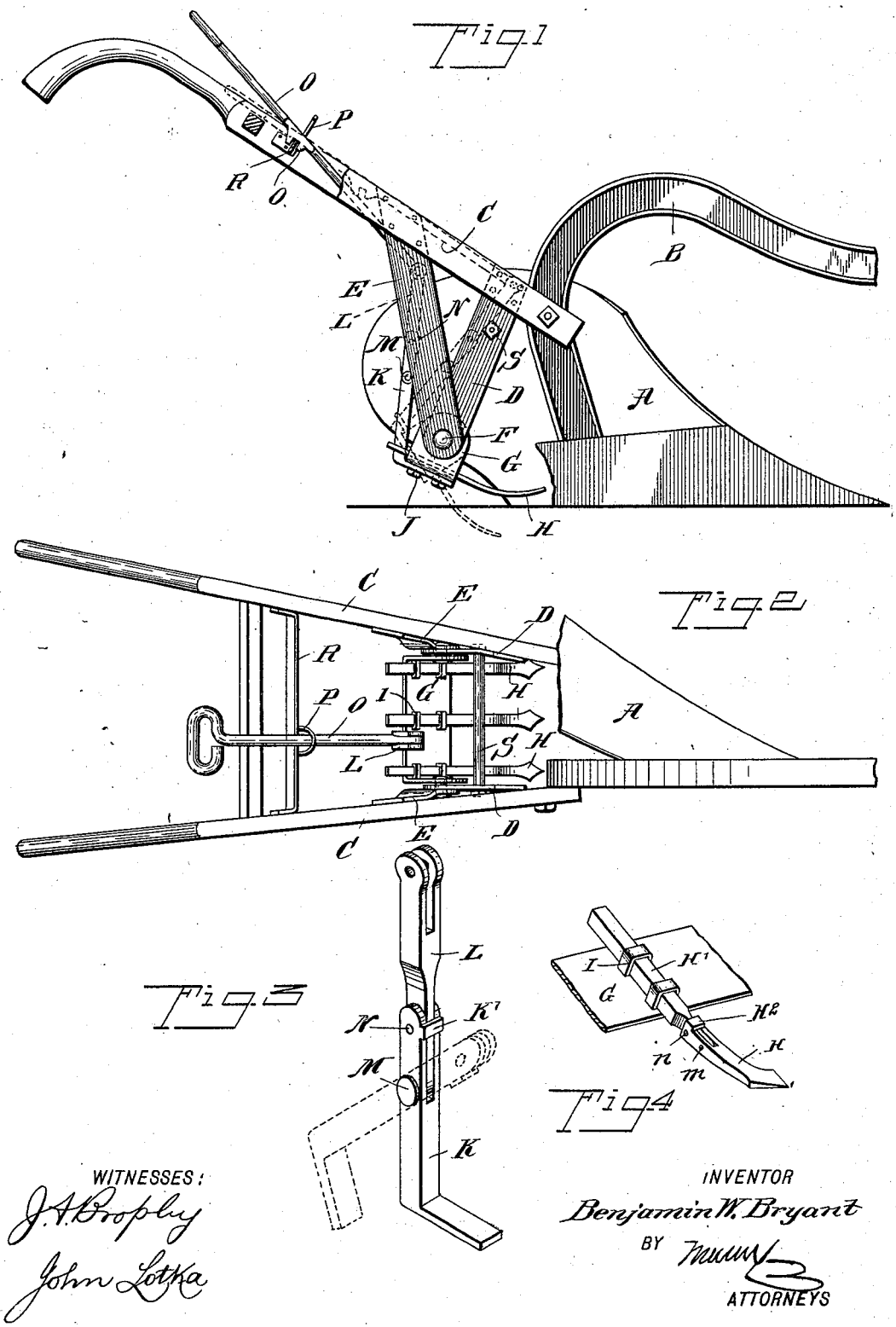

BENJAMIN W. BRYANT, OF BOSWELL, INDIANA, ASSIGNOR OF ONE-HALF TO ANSON B. McADAMS, OF BOSWELL, INDIANA.

SUBSOIL ATTACHMENT FOR PLOWS.

SPECIFICATION forming part of Letters Patent No. 687,115, dated November 19, 1901.

Application filed May 1, 1901. Serial No. 58,286. (No model.)

*To all whom it may concern:*

Be it known that I, BENJAMIN W. BRYANT, a citizen of the United States, and a resident of Boswell, in the county of Benton and State of Indiana, have invented a new and Improved Subsoil Attachment for Plows, of which the following is a full, clear, and exact description.

My invention relates to subsoil attachments for plows, and has for its object to provide an attachment for a common breaking-plow which will plow up the ground in the bottom of the furrow after the ordinary plow has thrown out the furrow, leaving the loose earth in the bottom of the furrow to be covered by the earth thrown up when the ordinary plow makes the next furrow. The improved attachment is also provided with a pin arranged to break in case the attachment strikes an unyielding obstruction, thus avoiding injury.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 is a side elevation of a plow provided with my improved attachment. Fig. 2 is a plan thereof. Fig. 3 is a perspective view of a detail, and Fig. 4 is a detail view of another arrangement of the break-pin.

A is an ordinary breaking-plow, and B the plow-beam, with the body or handles C connected therewith. Arms or brackets D E, converging toward their lower ends, extend downward from the body or handles C. The bolt or rod F which connects the lower ends of the brackets also forms a pivot for a plate G, carrying a series of small shares or shovels H, extending toward the plow A immediately in the rear thereof. The shovels are preferably adjustable lengthwise, and any suitable mechanism may be employed for this purpose—for instance, transverse clips I may be employed, which pass through the plate or carrier G and are provided with threaded portions to receive nuts J. By loosening the nuts the shovels may be released for adjustment. With the carrier G is rigidly connected an arm K, normally rigid with a link L, the link L and arm K being connected by a strong pin or bolt M and by a weaker pin or break-pin N. The arm K may have a side lug K', limiting its pivotal movement on the bolt M in one direction. With the upper end of the link L is pivotally connected an operating-handle O, having guided movement through a loop P and provided with a notched lug Q, adapted to engage a cross-bar R of the plow-body. This body or the attachment-frame (formed by the arms D E) has a stop for the forward movement of the link, the said stop consisting, for instance, of a cross-bar S, secured to the arms D.

With the rod or handle O hooked on the bar R the shovels H are raised into an inoperative position. When it is desired to throw the shovels into action, the handle O is lifted to clear the bar R and then pushed forward against the stop-bar S. This will cause the shovel-carrier G to swing into the position indicated in Fig. 1 by dotted lines, bringing the shovels H into operative contact with the soil. As the several shovels are spaced they will leave the loose earth they throw up at the bottom of the furrow made by the plow A, avoiding the throwing up of such loose earth on top of the furrow. When the plow A makes the next furrow, it will cover the ground previously subsoiled by the shovels H. The attachment is light and easily fitted to any ordinary breaking-plow, whether it be a walking or a riding plow. The attachment will not interfere with the easy running of the main plow, but will rather increase its steadiness. The throwing of the sobsoil-shovels into or out of action can be effected without material exertion. The draft required for the plow is not perceptibly increased. One team and one man will suffice for its operation, as usual. The depth to which the shovels H penetrate into the soil can be regulated very readily, as by adjusting the shovels lengthwise on their carrier G, or instead of this the same result may be obtained by attaching the frame-arms D E higher or lower on the plow body or handles C, or the stop-bar S may have a cranked or bent central portion, so that by turning said bar to different positions (it being locked when adjusted) the forward movement of the handle O and link L will be varied in extent. Should the shovels H strike an unyielding obstruction which would expose them to breakage, injury to the shovels will be prevented, since the pin N, designedly made weak, will break in this case, allowing the shovels, with their carrier, to swing on the bolt M, which becomes a temporary pivot. (See the position illustrated by dotted lines in Fig. 3.) The purpose of the lug K' is to hold the arm K and link L in longitudinal alinement, so as to facilitate the insertion of a new pin N.

Instead of providing the break-pin N on the connection of the carrier G with the handle O, I may, as shown in Fig. 4, locate an equivalent joint between the carrier G and each of the shovels H. Here the shank of each shovel is connected by a strong pin $m$ with the attaching-shank H', secured to the carrier. The pin $m$ forms a pivot for the shovel in case the weak pin or break-pin $n$ should snap upon the shovel's striking an obstruction. The projection H² serves the same purpose as the lug K' in Fig. 3. In either construction a joint comprising a break-pin and a stronger pin forming a pivot upon the breakage of the former is located between the handle and the subsoil-shovels H.

Having thus described my invention, I claim as new and desire to secure by Letters Patent—

1. The combination of the frame, the shovel-carrier pivoted thereto, the operating-handle for swinging said carrier, an arm connected with the carrier, a link connected with the handle, a break-pin connecting the arm with the link, and a pin or bolt connecting said arm and link and adapted to form a pivot for the carrier in case the first-named pin breaks.

2. The combination of the frame, the shovel-carrier pivoted thereto, the operating-handle for swinging said carrier, a break-pin joint in the connection of the handle with the carrier, and means for governing the extreme positions of the handle.

3. The combination of the frame, the shovel-carrier pivoted thereto, the operating-handle for swinging said carrier, and a break-pin joint located between the handle and the shovels, said joint comprising a break-pin normally connecting two parts between the handle and the shovel, but adapted to break under unusual strain, and a stronger pin permanently connecting said two parts and adapted to form a pivot for the shovels when the first-named pin breaks.

In testimony whereof I have signed my name to this specification in the presence of two subscribing witnesses.

BENJAMIN W. BRYANT.

Witnesses:
GEORGE W. DRIVLEBISS,
CHARLES E. KIRTLEY.